US011055477B2

(12) United States Patent
Onogi et al.

(10) Patent No.: US 11,055,477 B2
(45) Date of Patent: Jul. 6, 2021

(54) EVALUATION DEVICE, EVALUATION METHOD, AND RECORDING MEDIUM EVALUATING A LINE AS A START LINE OF A TABLE

(71) Applicant: FUJITSU LIMITED, Kawasaki (JP)

(72) Inventors: Makio Onogi, Yokohama (JP); Takahide Muramoto, Zama (JP); Takayuki Inoue, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 39 days.

(21) Appl. No.: 16/175,336

(22) Filed: Oct. 30, 2018

(65) Prior Publication Data

US 2019/0095412 A1    Mar. 28, 2019

Related U.S. Application Data

(63) Continuation of application No. PCT/JP2016/064521, filed on May 16, 2016.

(51) Int. Cl.
*G06F 40/177* (2020.01)
*G06F 40/143* (2020.01)
(Continued)

(52) U.S. Cl.
CPC ............ *G06F 40/143* (2020.01); *G06F 40/10* (2020.01); *G06F 40/12* (2020.01); *G06F 40/123* (2020.01);
(Continued)

(58) Field of Classification Search
CPC ....................................................... G06F 40/10
(Continued)

(56) References Cited

U.S. PATENT DOCUMENTS 5,918,238 A * 6/1999 Hayashi ............... G06F 40/103
715/223
7,149,967 B2 * 12/2006 Pollock ................ G06F 40/177
715/243
(Continued)

FOREIGN PATENT DOCUMENTS

JP          8-287172       11/1996
JP       2005-352774       12/2005
(Continued)

OTHER PUBLICATIONS

International Search Report dated Jul. 19, 2016 in corresponding International Patent Application No. PCT/JP2016/064521.
(Continued)

*Primary Examiner* — Maikhanh Nguyen
(74) *Attorney, Agent, or Firm* — Staas & Halsey LLP

(57) ABSTRACT

A non-transitory computer-readable recording medium stores therein an evaluation program that causes a computer to execute a process including: specifying, by referring to a storage that stores therein table information having a plurality of lines each of which includes a plurality of cells that are associated with characters or character strings, regarding each of the lines out of the plurality of lines, a combination of data classifications of the characters or the character strings associated with the plurality of cells that are included in each of the lines; acquiring a combination of the data classifications stored in the storage; comparing, regarding each of the lines out of the plurality of lines, the acquired combination of the data classifications with the specified combination of the data classifications; and evaluating, in accordance with comparison results, the line targeted for a comparison process.

4 Claims, 16 Drawing Sheets

(51) Int. Cl.
*G06Q 40/00* (2012.01)
*G06F 40/10* (2020.01)
*G06F 40/12* (2020.01)
*G06F 40/123* (2020.01)
*G06F 40/166* (2020.01)
*G06F 40/18* (2020.01)
*G06F 40/186* (2020.01)

(52) U.S. Cl.
CPC .......... *G06F 40/166* (2020.01); *G06F 40/177* (2020.01); *G06Q 40/00* (2013.01); *G06F 40/18* (2020.01); *G06F 40/186* (2020.01); *G06Q 40/12* (2013.12)

(58) Field of Classification Search
USPC ........................................................ 715/228
See application file for complete search history.

(56) References Cited

U.S. PATENT DOCUMENTS

| | | | | |
|---|---|---|---|---|
| 7,886,224 | B2* | 2/2011 | Sakai | G06F 16/258 |
| | | | | 715/234 |
| 9,633,457 | B2* | 4/2017 | Toyoshima | G06T 11/206 |
| 2006/0167911 | A1 | 7/2006 | Le Cam | |
| 2006/0184539 | A1 | 8/2006 | Blake et al. | |
| 2008/0082571 | A1* | 4/2008 | Sakai | G06F 16/258 |
| 2009/0019358 | A1* | 1/2009 | Blake | G06F 40/18 |
| | | | | 715/234 |
| 2009/0204588 | A1* | 8/2009 | Hosono | G06F 16/319 |
| 2012/0011118 | A1 | 1/2012 | Gleicher et al. | |
| 2013/0117268 | A1* | 5/2013 | Smith | G06F 40/151 |
| | | | | 707/739 |
| 2014/0184607 | A1* | 7/2014 | Toyoshima | G06T 11/206 |
| | | | | 345/440 |
| 2015/0120769 | A1 | 4/2015 | Ohyama | |

FOREIGN PATENT DOCUMENTS

| | | |
|---|---|---|
| JP | 2009-59250 | 3/2009 |
| JP | 2010-123149 | 6/2010 |
| JP | 2010-146109 | 7/2010 |
| JP | 2014-21694 | 2/2014 |
| WO | WO 2014/010068 A1 | 1/2014 |

OTHER PUBLICATIONS

Written Opinion of the International Searching Authority dated Jul. 19, 2016 in corresponding International Patent Application No. PCT/JP2016/064521.
Enachi, Mihaela, "XBRL and Financial Reporting Transparency", BRAND. Broad Research in Accounting, Negotiation, and Distribution, vol. 4, Issue 1, Mar. 2013, XP055639265, pp. 10-19.
Extended European Search Report dated Nov. 12, 2019 in corresponding European Patent Application No. 16902329.8.

* cited by examiner

FIG.3

| SEGMENT | Device | AREA | Asia |  |
|---|---|---|---|---|
|  |  | Assets | Liabilities |  |
| PERIOD | 2014.03.31 | 1,000 | 900 |  |
|  | 2014.06.30 | 2,000 | 1,900 |  |
|  | 2014.09.30 | 3,000 | 2,900 |  |
|  | 2014.12.31 | 4,000 | 3,900 |  |
| SEGMENT | Device | AREA | Europe |  |
|  |  | Assets | Liabilities |  |
| PERIOD | 2014.03.31 | 5,000 | 5,100 |  |
|  | 2014.06.30 | 6,000 | 6,100 |  |
|  | 2014.09.30 | 7,000 | 7,100 |  |
|  | 2014.12.31 | 8,000 | 8,100 |  |

Z-AXIS HEADER PORTION
X-AXIS HEADER PORTION
Y-AXIS HEADER PORTION

FINANCIAL DATA OF ASIA DISTRICT
FINANCIAL DATA OF EUROPE DISTRICT

FIG.4

[ASSOCIATION INFORMATION BETWEEN CELLS AND XBRL ELEMENTS]
...
LINE B: IN CASE OF TITLE LINE⇒VALUE OF SEGMENT
       : IN CASE OF DATA INPUT LINE⇒VALUE OF PERIOD
LINE C: IN CASE OF DATA INPUT LINE⇒VALUE OF <Assets>
LINE D: IN CASE OF DATA INPUT LINE⇒VALUE OF <Liabilities>
       : IN CASE OF TITLE LINE⇒VALUE OF AREA
...
[COMBINATION INFORMATION ON DATA TYPES]
X-AXIS HEADER PORTION: CHARACTER STRING TYPE, CHARACTER STRING TYPE
Y-AXIS HEADER PORTION: CHARACTER STRING TYPE, DATE TYPE
Z-AXIS HEADER PORTION: CHARACTER STRING TYPE, CHARACTER STRING TYPE, CHARACTER STRING TYPE, CHARACTER STRING TYPE
VALUE CELL PORTION: NUMERICAL VALUE TYPE, NUMERICAL VALUE TYPE
...

FIG.6

[ASSOCIATION INFORMATION BETWEEN CELLS AND XBRL ELEMENTS]
...
LINE B: IN CASE OF TITLE LINE⇒VALUE OF SEGMENT
       : IN CASE OF DATA INPUT LINE⇒VALUE OF PERIOD
LINE C: IN CASE OF DATA INPUT LINE⇒VALUE OF <Assets>
LINE D: IN CASE OF DATA INPUT LINE⇒VALUE OF <Liabilities>
       : IN CASE OF TITLE LINE⇒VALUE OF AREA
...
[COMBINATION INFORMATION ON DATA TYPES]
X-AXIS HEADER PORTION: "Assets Evaluation", "Liabilities Rank"
Y-AXIS HEADER PORTION: "PERIOD", CHARACTER STRING TYPE
Z-AXIS HEADER PORTION: "SEGMENT", CHARACTER STRING TYPE, "AREA", CHARACTER STRING TYPE
VALUE CELL PORTION: CHARACTER STRING TYPE, CHARACTER STRING TYPE
...

FIG.7

AUTOMATIC DETECTION OF START POSITION OF NEW TABLE

| SEGMENT (CHARACTER STRING TYPE) | Device (CHARACTER STRING TYPE) | AREA (CHARACTER STRING TYPE) | Asia (CHARACTER STRING TYPE) |
|---|---|---|---|
| | | Assets Evaluation (CHARACTER STRING TYPE) | Liabilities Rank (CHARACTER STRING TYPE) |
| PERIOD (CHARACTER STRING TYPE) | 2014.1Q (CHARACTER STRING TYPE) | Bad (CHARACTER STRING TYPE) | D (CHARACTER STRING TYPE) |
| | 2014.2Q (CHARACTER STRING TYPE) | Good (CHARACTER STRING TYPE) | C (CHARACTER STRING TYPE) |
| | 2014.3Q (CHARACTER STRING TYPE) | Better (CHARACTER STRING TYPE) | B (CHARACTER STRING TYPE) |
| | 2014.4Q (CHARACTER STRING TYPE) | Best (CHARACTER STRING TYPE) | A (CHARACTER STRING TYPE) |
| SEGMENT (CHARACTER STRING TYPE) | Device (CHARACTER STRING TYPE) | AREA (CHARACTER STRING TYPE) | Europe (CHARACTER STRING TYPE) |
| | | Assets Evaluation (CHARACTER STRING TYPE) | Liabilities Rank (CHARACTER STRING TYPE) |
| PERIOD (CHARACTER STRING TYPE) | 2014.1Q (CHARACTER STRING TYPE) | Good (CHARACTER STRING TYPE) | C (CHARACTER STRING TYPE) |
| | 2014.2Q (CHARACTER STRING TYPE) | Good (CHARACTER STRING TYPE) | C (CHARACTER STRING TYPE) |
| | 2014.3Q (CHARACTER STRING TYPE) | Good (CHARACTER STRING TYPE) | C (CHARACTER STRING TYPE) |
| | 2014.4Q (CHARACTER STRING TYPE) | Good (CHARACTER STRING TYPE) | C (CHARACTER STRING TYPE) |

FIG.10

XBRL TAXONOMY 21

[ITEM DEFINITION]
<Assets>
NUMERICAL VALUE TYPE
</Assets>
<Liabilities>
NUMERICAL VALUE TYPE
</Liabilities>

[TABLE LAYOUT]
X-AXIS:
 TITLE: "Assets"  VALUE: Assets ELEMENT
 TITLE: "Liabilities" VALUE: Liabilities ELEMENT
Y-AXIS:
 TITLE: "PERIOD" VALUE:
  {CHARACTER STRING TYPE}
Z-AXIS:
 TITLE:"SEGMENT"
  VALUE: {"Device", "Ubiquitous", ...}
 TITLE:"AREA"
  VALUE: {"Asia", "Oceania", ...}

MAPPING DEFINITION 22

[ASSOCIATION INFORMATION BETWEEN CELLS AND XBRL ELEMENTS]
...
LINE B: IN CASE OF TITLE LINE ⇒ VALUE OF SEGMENT
 ; IN CASE OF DATA INPUT LINE ⇒ VALUE OF PERIOD
LINE C: IN CASE OF DATA INPUT LINE ⇒ VALUE OF <Assets>
LINE D: IN CASE OF DATA INPUT LINE ⇒ VALUE OF <Liabilities>
 ; IN CASE OF TITLE LINE ⇒ VALUE OF AREA

[COMBINATION INFORMATION ON DATA TYPES]
X-AXIS HEADER PORTION: CHARACTER STRING TYPE, CHARACTER STRING TYPE
Y-AXIS HEADER PORTION: CHARACTER STRING TYPE, CHARACTER STRING TYPE
Z-AXIS HEADER PORTION: CHARACTER STRING TYPE, ENUMERATION TYPE x, CHARACTER STRING TYPE, ENUMERATION TYPE y
VALUE CELL PORTION: NUMERICAL VALUE TYPE, NUMERICAL VALUE TYPE
...

XBRL INSTANCE 41

<Assets>
 VALUE: 1000
 PERIOD: 2014.03.31
 SEGMENT: Device
 AREA: Asia
</Assets>
...
<Liabilities>
 VALUE: 8100
 PERIOD: 2014.12.31
 SEGMENT: Device
 AREA: Europe
</Liabilities>

DATA CONVERSION UNIT 33

INQUIRY ↔ XBRL TAXONOMY / MAPPING DEFINITION
INPUT ← INPUT COMPLETION SHEET
OUTPUT → XBRL INSTANCE

INPUT COMPLETION SHEET 24

| | A | B | C | D |
|---|---|---|---|---|
| 1 | SEGMENT | Device | AREA | Asia |
| 2 | | | Assets | Liabilities |
| 3 | PERIOD | 2014.03.31 | 1,000 | 900 |
| 4 | | 2014.06.30 | 2,000 | 1,900 |
| 5 | | 2014.09.30 | 3,000 | 2,900 |
| 6 | | 2014.12.31 | 4,000 | 3,900 |
| 7 | SEGMENT | Device | AREA | Europe |
| 8 | | | Assets | Liabilities |
| 9 | PERIOD | 2014.03.31 | 5,000 | 5,100 |
| 10 | | 2014.06.30 | 6,000 | 6,100 |
| 11 | | 2014.09.30 | 7,000 | 7,100 |
| 12 | | 2014.12.31 | 8,000 | 8,100 |

FIG.16

|  |  | Assets | Liabilities |
|---|---|---|---|
| PERIOD | 2014.03.31 | | |
| | 2014.06.30 | | |
| | 2014.09.30 | | |
| | 2014.12.31 | | |

EVALUATION DEVICE, EVALUATION METHOD, AND RECORDING MEDIUM EVALUATING A LINE AS A START LINE OF A TABLE

CROSS-REFERENCE TO RELATED APPLICATION

This application is a continuation application of International Application PCT/JP2016/064521, filed on May 16, 2016, and designating the U.S., the entire contents of which are incorporated herein by reference.

FIELD

The present invention relates to an evaluation method and the like.

BACKGROUND

Financial statements using Extensible Business Reporting Language (XBRL) are obliged to submit to the Financial Service Agency. XBRL is an Extensible Markup Language (XML) based language developed as a data description language used for easily preparing, distributing, and using business reports.

The data of financial statements submitted to the supervisory authorities, such as the Financial Service Agency or the Tokyo Stock Exchange, is referred to as instances. The instances are generated based on fields of definition (called "taxonomies") that are opened to the public by the supervisory authorities. Taxonomies are constituted of schemas, in each of which a name or type information of an XBRL element corresponding to an item is defined, and linkbases, in each of which a relationship between XBRLs is defined. The relationship between XBRL elements correspond to, for example, a display order or an aggregation method of items in the financial statements.

Here, a reference example of the flow of generating instances as financial statements will be described with reference to FIG. 15. FIG. 15 is a diagram illustrating a reference example of the flow of generating instances. In a supervisory authority, taxonomies described in XBRL are stored and opened to the public. In a submission company, a mapping engine downloads a released taxonomy (Step S110) and generates a mapping definition and a template sheet based on the taxonomy (Step S120). The template sheet mentioned here indicates a table generated by using spreadsheet software, such as Excel. The mapping definition mentioned here indicates a definition in which position and size information on cells of a header portion or input portions in the table is associated with property information on XBRL elements that are associated with the cells.

Then, a person in charge inputs financial data to the template sheet and generates an input completion sheet (Step S130). The person in charge inputs the input completion sheet to the mapping engine and the mapping engine converts the received input completion sheet to an instance (Step S140) and then uploads the instance to the supervisory authority (Step S150). The supervisory authority accumulates and verifies the instances.

FIG. 16 is a diagram illustrating a reference example of the table that indicates the template sheet. As illustrated in FIG. 16, the template sheet is a two-dimensional table and the format of the template sheet is unified.

In this way, the mapping engine uses the taxonomy that is opened to the public and prepares the unified template sheet and the mapping definition, thereby converting the input completion sheet that has been input to the template sheet to the instance.

Here, a reference example of a mapping process of converting the input completion sheet to the instance will be described with reference to FIG. 17. FIG. 17 is a diagram illustrating a reference example of the mapping process. As illustrated in FIG. 17, the mapping engine sequentially reads each of lines in the input completion sheet from the top; refers to, regarding the read lines, the mapping definition; and converts the input completion sheet to the instance.

Patent Document 1: Japanese Laid-open Patent Publication No. 2010-123149

Patent Document 2: Japanese Laid-open Patent Publication No. 2010-146109

SUMMARY

According to an aspect of the embodiments, a non-transitory computer-readable recording medium stores therein an evaluation program that causes a computer to execute a process including: specifying, by referring to a storage that stores therein table information having a plurality of lines each of which includes a plurality of cells that are associated with characters or character strings, regarding each of the lines out of the plurality of lines, a combination of data classifications of the characters or the character strings associated with the plurality of cells that are included in each of the lines; acquiring, by referring to a storage that stores therein information on combinations of data classifications associated with a plurality of cells that are included in specific lines out of the plurality of lines, a combination of the data classifications stored in the storage; comparing, regarding each of the lines out of the plurality of lines, the acquired combination of the data classifications with the specified combination of the data classifications; and evaluating, in accordance with comparison results, the line targeted for a comparison process.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of an input completion sheet according to the embodiment;

FIG. 4 is a diagram illustrating a first example of mapping definition according to the embodiment;

FIG. 6 is a diagram illustrating a second example of the mapping definition according to the embodiment;

FIG. 7 is a diagram illustrating a second specific example of the data conversion process according to the embodiment;

FIG. 10 is a diagram illustrating the outline of the data conversion process according to the embodiment;

FIG. 16 is a diagram illustrating a reference example of a table that indicates a template sheet.

DESCRIPTION OF EMBODIMENTS

However, in recent years, in response to requests from the supervisory authorities and users for more detailed financial reports, the international standard specifications (table linkbase) for describing table layout of XBRL data are recommended. Consequently, it is conceivable that the tables used for financial reports are changed from the two-dimensional tables to tables with different sizes or tables having a different number of tables for each submission company. For example, it is conceivable that a single table generated in units of the whole company is changed to a plurality of tables to be generated in units of business facilities or it is conceivable that a single table generated every year is changed to a plurality of tables to be generated every month.

If so, there is a problem in that, when the mapping engine converts tables to instances, if a plurality of tables is present, the mapping engine is not able to distinguish the start position of each of the tables. Namely, the mapping engine sequentially read each of the lines in the tables from the top; refers to the mapping definition regarding the read lines; and converts to the instances. However, because the cells used in the tables are variable cells, the mapping engine is not able to distinguish the end position of each of the tables by referring to the mapping definition. As a result, the mapping engine is not able to distinguish the start position of the next table.

Preferred embodiments of an evaluation program, an evaluation device, and an evaluation method disclosed in the present invention will be described in detail below with reference to the accompanying drawings. Furthermore, the present invention is not limited to the embodiments.

Configuration of the Evaluation Device According to the Embodiment

Figure 1:
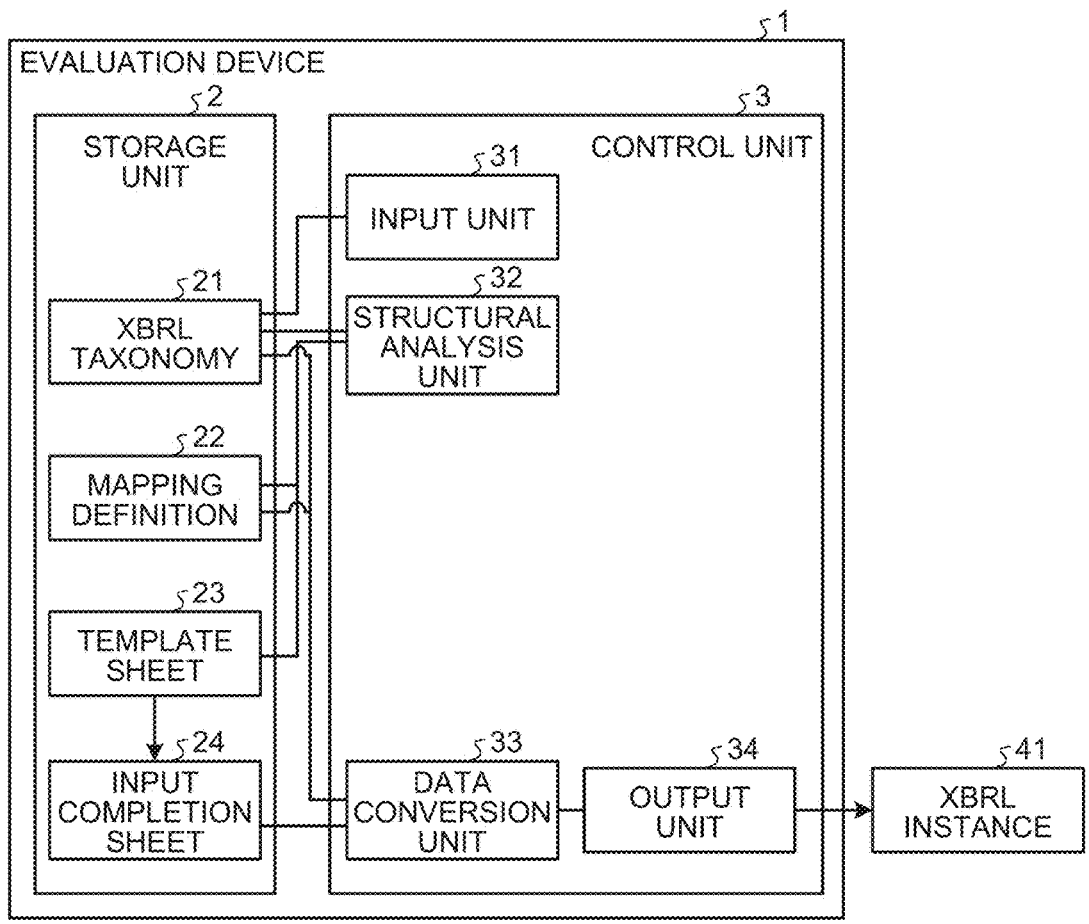
FIG. 1 is a functional block diagram illustrating a configuration of an evaluation device according to an embodiment.

FIG. 1 is a functional block diagram illustrating a configuration of an evaluation device according to an embodiment. As illustrated in FIG. 1, when an evaluation device 1 converts data in a table format to an instance described in XBRL, if a plurality of tables is present, the evaluation device 1 uses combinations of data classifications included in each line in each of the tables, performs evaluation on each line, and distinguishes the start position of each of the tables. The instance mentioned here is referred to as an "XBRL instance". Converting the data in a table format to the XBRL instance is synonymous with mapping the data in a table format to the XBRL instance.

The evaluation device 1 includes a storage unit 2 and a control unit 3.

The storage unit 2 is, for example, a storage device, such as a nonvolatile semiconductor memory device including a flash memory, a ferroelectric random access memory (FRAM) (registered trademark), and the like. Furthermore, the storage unit 2 includes an XBRL taxonomy 21, a mapping definition 22, a template sheet 23, and an input completion sheet 24.

The XBRL taxonomy 21 is obtained by defining the structure of each of the XBRL elements and is formed by schemas, linkbases, and table linkbases. The schema is a dictionary that stores therein attribute information, such as a name or a data type of an XBRL element, and corresponds to, in the embodiment, an "item definition". The linkbase is a document in which, for example, a parent-child relationship between the XBRL elements, the display order, the display name, and the like are described. The table linkbase is a document in which a table layout of the XBRL elements is described and corresponds to, in the embodiment, a "table layout".

The mapping definition 22 defines combination information on data types in a header (title) portion in a table. In the mapping definition 22, for example, a combination of data types in each of a header portion in the X-axis, a header portion in the Y-axis, and a header portion in the Z-axis is defined. Examples of the data types include a character string type, a date type, and a numerical value type; however, the data types are not limited to these. Furthermore, the mapping definition 22 defines association between cells and the XBRL elements in a table. For example, in the mapping definition 22, property information on an XBRL element that is associated with the position of a line of a cell or associated with a cell in the header portion or the input portion in the table is defined. Furthermore, the mapping definition 22 is generated by a structural analysis unit 32, which will be described later. Furthermore, an example of the content of the mapping definition 22 will be described later.

The template sheet 23 is a general-purpose template sheet representing an input form reproduced from a financial statement. The template sheet 23 mentioned here is a table generated by using spreadsheet software, such as Excel or the like. Furthermore, the template sheet 23 is defined by using a table linkbase and is generated by the structural analysis unit 32 that will be described later. Furthermore, an example of the content of the template sheet 23 will be described later.

The input completion sheet 24 is a sheet in which financial data has already been input to the template sheet 23. The input completion sheet 24 is input by a user.

The control unit 3 includes an internal memory that stores therein control data and programs in which various kinds of procedures are prescribed, whereby the control unit 3 executes various processes. Furthermore, the control unit 3 corresponds to, for example, an integrated circuit, such as an application specific integrated circuit (ASIC), a field programmable gate array (FPGA), or the like, or corresponds to an electronic circuit, such as a central processing unit (CPU), a micro processing unit (MPU), or the like. Furthermore, the control unit 3 includes an input unit 31, the structural analysis unit 32, a data conversion unit 33, and an output unit 34.

The input unit 31 inputs the XBRL taxonomy 21 and stores the input XBRL taxonomy 21 in the storage unit 2.

The structural analysis unit 32 analyzes the XBRL taxonomy 21 and generates the mapping definition 22 and the template sheet 23 that are in accordance with the definition of the table linkbase (table layout). The structural analysis unit 32 stores the generated mapping definition 22 and the template sheet 23 in the storage unit 2.

Example of the Template Sheet

Figure 2:
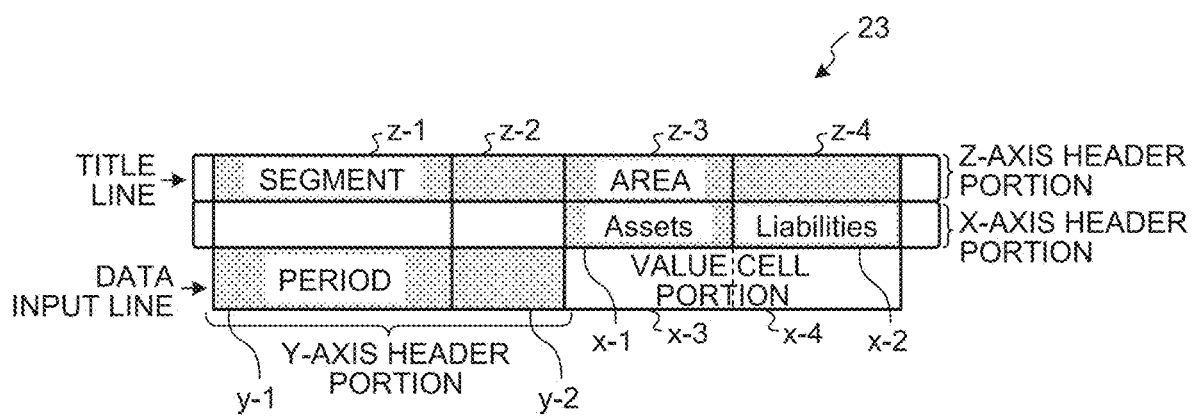
FIG. 2 is a diagram illustrating an example of a template sheet according to the embodiment.

In the following, an example of the template sheet 23 will be described with reference to FIG. 2. FIG. 2 is a diagram illustrating an example of the template sheet according to the embodiment. As illustrated in FIG. 2, the template sheet 23 has the header portion in the X-axis, the header portion in the Y-axis, the header portion in the Z-axis, and a value cell portion. The header portion in each of the axes is hierarchically defined.

The header portion in the Z-axis is set at the top in a single table as a substitute for the title. The header portion in the Z-axis has parent headers z-1 and z-3 and child headers z-2 and z-4. Here, in the parent header z-1, "SEGMENT" (section name) is set. In the child header z-2, as a child header associated with "SEGMENT", a value is input by the user. Similarly, in the parent header z-3, "AREA" (district name) is set. In the child header z-4, as a child header associated with "AREA", a value is input by the user. Furthermore, the header portion in the Z-axis represents the line indicating the title of the table and is thus referred to as the "title line of the table". In other words, the "title line of the table" indicates the line that has been added in order to input a new value to another table.

The header portion in the Y-axis has a parent header y-1 and a child header y-2. Here, in the parent header y-1, "PERIOD" is set. In the child header y-2, as a child header associated with "PERIOD", a value is input by the user. In the child header y-2, for example, a year and a period can be added. Furthermore, the header portion in the Y-axis represents the line in which data is input and is thus sometimes referred to as a "data input line". In other words, the "data input line" indicates the line that has been added in order to continuously input a value to the same table.

The header portion in the X-axis has parent headers x-1 and x-2 and value cell portions x-3 and x-4 that are associated with the corresponding parent headers. Here, in the parent header x-1, "Assets" (property) is set as an XBRL element. In the value cell portion x-3, the value associated with "Assets" is input by the user. In the parent header x-2, "Liabilities" (debt) is set as an XBRL element. In the value cell portion x-4, the value associated with "Liabilities" is input by the user. Furthermore, the value cell portion represents the line in which data is input and is thus sometimes referred to as a "data input line".

Furthermore, each of the data types is input to the corresponding cells in the template sheet 23.

Example of the Input Completion Sheet

FIG. 3 is a diagram illustrating an example of an input completion sheet according to the embodiment. The input completion sheet 24 illustrated in FIG. 3 is the result obtained after the user has input the financial data to the template sheet 23 illustrated in FIG. 2. The input completion sheet 24 is constituted by a plurality of tables and each of the tables uses the Z-axis header portion as a start line. Here, two tables are illustrated. In one table, financial data of the Asia district is illustrated and, in the other table, financial data of the Europe district is illustrated. Furthermore, in FIG. 3, the number of tables is two; however, the number of tables is not limited to this and three tables or four tables may also be used. Furthermore, the number of tables may also be one.

First Example of the Mapping Definition

FIG. 4 is a diagram illustrating a first example of the mapping definition according to the embodiment. As illustrated in FIG. 4, the mapping definition 22 includes combination information on the data types. In the combination information on the data types, a combination of the data types in the header portion in the X-axis is set. In the combination information on the data types, a combination of the data types in the header portion in the Y-axis is set. In the combination information on the data types, a combination of the data types in the header portion in the Z-axis is set. In the combination information on the data types, a combination of values in the value cell portion is set. Here, as the combination of the data types in the header portion in the X-axis, a set of "character string type, character string type" is set. As the combination of the data types in the header portion in the Y-axis, a set of "character string type, date type" is set. As the combination of the data types in the header portion in the Z-axis, a set of "character string type, character string type, character string type, character string type" is set. As the combination of the data types in the value cell portion, a set of "numerical value type, numerical value type" is set.

The mapping definition 22 further includes association information between cells and XBRL elements. In the association information between cells and XBRL elements, regarding the cell in which a value is input, association between a position and an XBRL element is set. Here, regarding the cell in which a value is input to a line B, if the line is a title line, the cell is associated with the value of the SEGMENT that is represented as an XBRL element. If the line is a data input line, the cell is associated with the value of PERIOD that is represented as an XBRL element. Regarding the cell in which a value is input to a line C, if the line is a data input line, the cell is associated with the value of <Assets> that is represented as an XBRL element. Regarding the cell in which a value is input to a line D, if the line is a data input line, the cell is associated with the value of <Liabilities> that is represented as an XBRL element. If the line is a title line, the cell is associated with the value of AREA that is represented as an XBRL element.

A description will be given here by referring back to FIG. 1. The data conversion unit 33 refers to the input completion sheet 24 and specifies, regarding each of the lines out of the plurality of lines, a combination of data types of data associated with a plurality of cells that are included in each of the lines. The data type is an example of a data classification. For example, the data conversion unit 33 reads, when starting data conversion, the header portion in the Z-axis and the header portion in the X-axis from the input completion sheet 24. The data conversion unit 33 sequentially reads the subsequent lines. When the data conversion unit 33 reads a line, the data conversion unit 33 specifies a combination of data types in the read line. Furthermore, the combination of data types in the read line is specified from the data types that are set in the input completion sheet 24.

The data conversion unit 33 refers to the mapping definition 22 and acquires each of the combinations of the data classifications that are associated with the plurality of cells included in the data input lines and the title line in the table. Furthermore, the combination of the data types in the data input line corresponds to the sum of the combination of the data types in the header portion in the Y-axis included in the mapping definition 22 and the combination of the data types in the value cell portion. The combination of the data types in the title line of the table corresponds to the combination of the data types in the header portion in the Z-axis included in the mapping definition 22.

The data conversion unit 33 compares, regarding each of the lines out of the plurality of lines, the acquired combination of the data types with the specified combination of the data types and performs evaluation on the line targeted for a comparison process in accordance with the comparison result. For example, the data conversion unit 33 determines whether the combination of the data types in the read line is the same as that in the data input line. If the combination of the data types in the read line is not the same as that in the data input line, the data conversion unit 33 determines whether the combination of the data types in the read line is the same as that in the title line of the table. If the combination of the data types in the read line is the same as that in the title line of the table, the data conversion unit 33 detects that the read line is the start position of the next table. Namely, when the data conversion unit 33 analyzes the cell for each line from the top to the bottom and from the left end to the right end, the data conversion unit 33 detects the start position of the next table by checking the cells against the mapping definition 22. Then, when the data conversion unit 33 detects the start position of the next table, the data conversion unit 33 performs the data conversion process on the next table. Furthermore, if the combination of the data types in the read line is the same as that in the data input line, the data conversion unit 33 maps the data input line and adds the line to an XBRL instance 41. Then, the data conversion unit 33 performs the data conversion process on the subsequent line.

The output unit 34 outputs the XBRL instance 41 that indicates the results obtained by conversion performed by the data conversion unit 33. For example, the output unit 34 may also output the XBRL instance 41 that is the conversion results to a monitor or may also store the XBRL instance 41 in the storage unit 2.

First Specific Example of the Data Conversion Process

Figure 5:
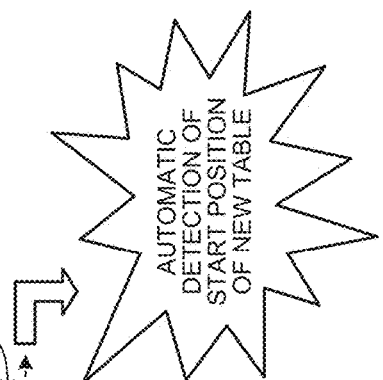
FIG. 5 is a diagram illustrating a first specific example of a data conversion process according to the embodiment.

In the following, a specific example of the data conversion process performed by using the mapping definition 22 illustrated in FIG. 4 will be described with reference to FIG. 5. FIG. 5 is a diagram illustrating a first specific example of the data conversion process according to the embodiment. In FIG. 5, the input completion sheet 24 is illustrated.

As illustrated in FIG. 5, the data conversion unit 33 detects the start position of the next table in the input completion sheet 24 by sequentially checking, one by one, each of the lines in the input completion sheet 24 from the top to the bottom against the mapping definition 22.

For example, it is assumed that the data conversion unit 33 refers to the input completion sheet 24 and reads a line indicated by a code a1. The data conversion unit 33 specifies a combination of the data types included in the read line. In this case, the combination of the data types in the line indicated by the code a1 is a set of "character string type, date type, numerical value type, numerical value type".

The data conversion unit 33 refers to the mapping definition 22 and acquires each of the combinations of the data types included in the data input line and the title line of the table. Here, the combination of the data types in the line corresponds to the combination of the combination of the data types in the header portion in the Y-axis included in the combination information on the data types in the mapping definition 22 and the combination of the data types in the value cell portion. As a result, the combination of the data types in the data input line is a set of "character string type, date type, numerical value type, numerical value type". The combination of the data types included in the title line of the table corresponds to the combination of the data types in the header portion in the Z-axis included in the combination information on the data types in the mapping definition 22 and is a set of "character string type, character string type, character string type, character string type".

The data conversion unit 33 determines whether the combinations of the data types in the lines indicated by the code a1 are the same as those in the data input lines. In this case, the combinations of the data types in all of the lines are a set of "character string type, date type, numerical value type, numerical value type". Thus, the data conversion unit 33 maps the lines indicated by the code a1, adds the lines to the XBRL instance 41, and performs the data conversion process on the subsequent lines that are present below the processed line.

Then, it is assumed that the data conversion unit 33 refers to the input completion sheet 24 and reads the line indicated by a code a2. The data conversion unit 33 specifies the combination of the data types in the read line. In this case, the combination of the data types in the line indicated by the code a2 is a set of "character string type, character string type, character string type, character string type".

The data conversion unit 33 determines whether the combination of the data types in the line indicated by the code a2 is the same as that in the data input line. In this case, because the combination of the data types in the line indicated by the code a2 is a set of "character string type, character string type, character string type, character string type" and the combination of the data types in the data input line is a set of "character string type, date type, numerical value type, numerical value type", the combinations of the data types are not the same. Thus, the data conversion unit 33 determines whether the combination of the data types in the line indicated by the code a2 is the same as that in the title line of the table. Here, the combinations of the data types in all of the lines are a set of "character string type, character string type, character string type, character string type".

Thus, the data conversion unit 33 detects that the line indicated by the code a2 is the start position of the next table. Then, the data conversion unit 33 performs the data conversion process on the next table in the input completion sheet 24.

Incidentally, there may be a case in which the combinations of the data types in all of the lines in the input completion sheet 24 are the same. For example, this is a case in which the combinations of the data types in all of the lines are a set of "character string type, character string type, character string type, character string type". In such a case, because the data conversion unit 33 is not able to distinguish whether the line read from the input completion sheet 24 is the data input line or the title line of the table, the data conversion unit 33 is not able to detect the start position of the next table. Thus, if the combination of the data types read from the input completion sheet 24 is the same as that in the data input line, the data conversion unit 33 determines whether the read line has the same combination as the combination of a fixed character string and the data type in the title line of the table. In the following, a second example of the mapping definition 22 used for this determination will be described.

Second Example of the Mapping Definition

FIG. 6 is a diagram illustrating a second example of the mapping definition according to the embodiment. As illustrated in FIG. 6, the mapping definition 22 includes the combination information on the data types. In the combination information on the data types, a combination of fixed character strings in the header portion in the X-axis is set. In the combination information on the data types, a combination of the fixed character string and the data type in the header portion in the Y-axis is set. In the combination information on the data types, a combination of the fixed character string and the data type in the header portion in the Z-axis is set. In the combination information on the data types, a combination of the data types in the value cell portion is set. Here, as the combination of the data types in the header portion in the X-axis, a set of ""Assets Evaluation, "Liabilities Rank"" is set. As the combination of the data types in the header portion in the Y-axis, a set of ""PERIOD", character string type"" is set. As the combination of the data types in the header portion in the Z-axis, a set of ""SEGMENT", character string type, "AREA", character string type"" is set. As the combination of the data types in the value cell portion, a set of "character string type, character string type" is set. Each of "Assets Evaluation", "Liabilities Rank", "PERIOD", "SEGMENT", and "AREA" is an XBRL element. These fixed character strings are set, by the structural analysis unit 32, in the mapping definition 22 in accordance with the definition of the table layout of the XBRL taxonomy 21.

Furthermore, the mapping definition 22 further includes association information between the cells and the XBRL elements; however, descriptions thereof are the same as those described with reference to FIG. 4 and will be thus omitted.

Second Specific Example of the Data Conversion Process

A specific example of the data conversion process performed by using the mapping definition 22 illustrated in FIG. 6 will be described with reference to FIG. 7. FIG. 7 is a diagram illustrating a second specific example of the data conversion process according to the embodiment. In FIG. 7, the input completion sheet 24 is illustrated.

As illustrated in FIG. 7, the data conversion unit 33 detects the start position of the next table in the input completion sheet 24 by sequentially checking the lines in the input completion sheet 24 for each line from the top to the bottom against the mapping definition 22.

For example, it is assumed that the data conversion unit 33 refers to the input completion sheet 24 and reads the line indicated by a code b1. The data conversion unit 33 specifies, regarding the read line, the combination of the characters or the character strings and the combination of the data types. In this case, regarding the combination of the characters or the character strings in the line indicated by the code b1, a set of ""PERIOD", "2014.2Q", "Good", and "C"" is specified. Regarding the combination of the data types in the line indicated by the code b1, a set of "character string type, character string type, character string type, character string type" is specified.

The data conversion unit 33 refers to the mapping definition 22 and acquires each of the combinations of the character strings and the data types included in the data input lines and the title lines in the table. Here, the combination of the character strings and the data types in the data input line is the combination of the character strings and the data types in each of the header portion in the Y-axis and the value cell portion that are included in the combination information on the data types stored in the mapping definition 22. Consequently, the combination of the character strings and the data types in the data input line is a set of ""PERIOD" (character string type), character string type, character string type, character string type"". The combination of the character strings and the data types included in the title line of the table is the combination of the data types in the header portion in the Z-axis included in the combination information on the data types stored in the mapping definition 22. Consequently, the combination of the character strings and the data types included in the title line of the table is a set of ""SEGMENT" (character string type), character string type, "AREA" (character string type), character string type".

The data conversion unit 33 determines whether the combinations of the data types in the line indicated by the code b1 are the same as those in the data input line. Here, the combinations of the data types in all of the lines are a set of "character string type, character string type, character string type, character string type". Thus, the data conversion unit 33 determines whether the combination of each of the lines indicated by the code b1 is the same as that of the character strings and the data types in the title line of the table. Here, the combination of the character strings and the data types in each of the lines indicated by the code b1 is a set of ""PERIOD", character string type, "Good", character string type". The combination of the character strings and the data types in the title line of the table is a set of ""SEGMENT", character string type, "AREA", character string type" (see FIG. 6). The lines indicated by the code b1 do not have the same combination as that of the character strings and the data types in the title line of the table. Namely, each of the lines indicated by the code b1 is not the title line of the table but is the data input line. Thus, the data conversion unit 33 maps the lines indicated by the code b1, and adds the lines to the XBRL instance 41, and performs the data conversion process on the subsequent lines that are present below the processed line.

Then, it is assumed that the data conversion unit 33 refers to the input completion sheet 24 and reads the code b2. The data conversion unit 33 specifies, regarding the read line, the combination of the characters or the character strings and the combination of the data types. Here, regarding the combination of the characters or the character strings in the line indicated by the code b2, a set of ""SEGMENT", "Device", "AREA", "Europe"" is specified. Regarding the combination of the data types in the line indicated by the code b2, a set of "character string type, character string type, character string type, character string type" is specified.

The data conversion unit 33 determines whether the combination of the data types in the line indicated by the code b2 is the same as that in the data input line. Here, the combinations of the data types in all of the lines are a set of "character string type, character string type, character string type, character string type". Thus, the data conversion unit 33 determines whether the line indicated by the code b2 has the same combination as the combination of the character strings and the data types in the title line of the table. Here, the combination of the character strings and the data types in the line indicated by the code b2 is a set of ""SEGMENT", character string type, "AREA", character string type". The combination of the character strings and the data types in the title line of the table is a set of ""SEGMENT", character string type, "AREA", character string type". The line indicated by the code b2 has the same combination as the combination of the character strings and the data types in the title line of the table. Namely, the line indicated by the code b2 is the title line of the table.

Thus, the data conversion unit 33 detects that the line indicated by the code b2 is the start position of the next table. Then, a data conversion unit 33 performs the data conversion process on the next table in the input completion sheet 24.

As described above, in the combination information on the data types in the mapping definition 22, the combination of the fixed character strings and the data types in the header portion in each of the axes is set. However, the combination information on the data types in the mapping definition 22 is not limited to this. There may be a case in which data indicated by a data type is previously set and enumerated. In such a case, an identifier of the enumeration type may be set as a data type indicated by the combination information on the data type. The identifier of the enumeration type is associated with the XBRL taxonomy 21. Examples of the identifiers of the enumeration type include an enumeration type x and an enumeration type y. When the data conversion unit 33 uses this type of the mapping definition 22 and reads a line in the input completion sheet 24, if the combination of the data types in the read line has the same combination as that in the data input line, the data conversion unit 33 may also further perform the following process. Namely, the data conversion unit 33 determines whether the read line has the same combination as the combination of the character strings that includes the character string having the enumeration type in the title line of the table. In the following, a third example of the mapping definition 22 that is used for this determination will be described.

Third Example of the Mapping Definition

Figure 8:
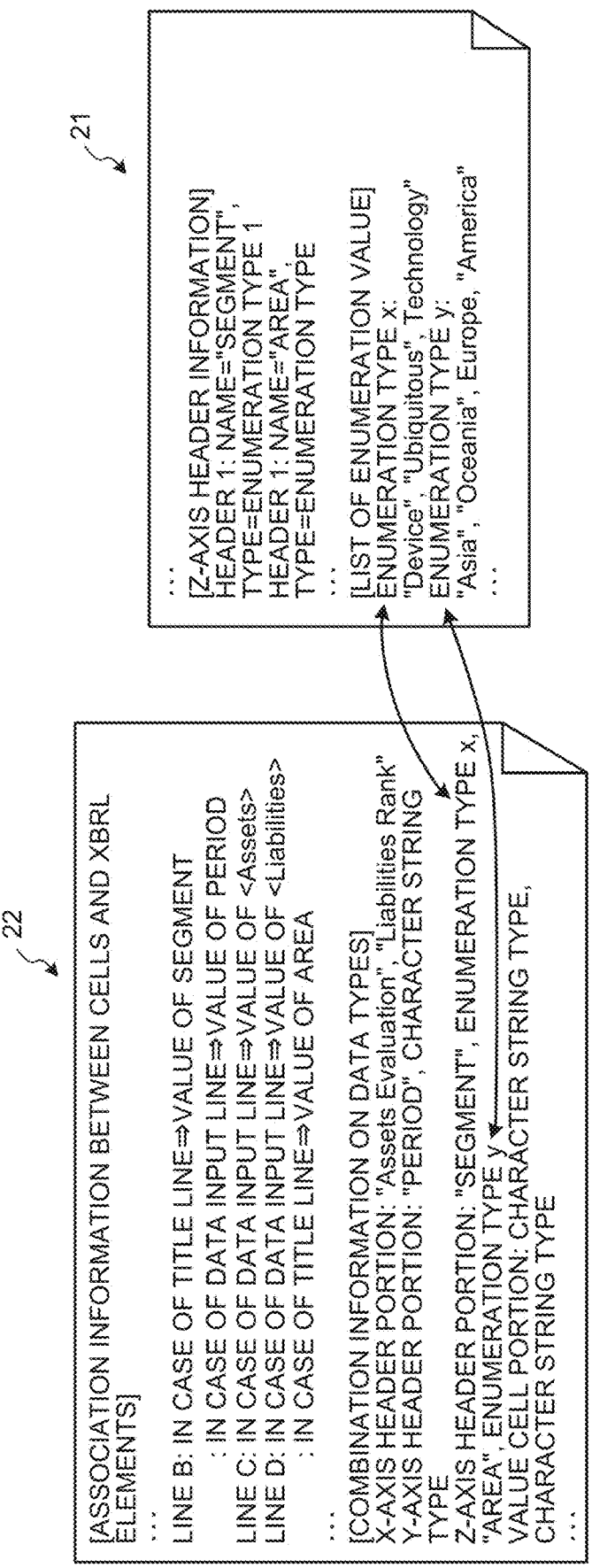
FIG. 8 is a diagram illustrating a third example of the mapping definition according to the embodiment.

FIG. 8 is a diagram illustrating a third example of the mapping definition according to the embodiment. As illustrated in FIG. 8, the mapping definition 22 includes combination information on the data types. In the combination information on the data types, a combination of fixed character strings in the header portion in the X-axis is set. In the combination information on the data types, a combination of the fixed character string and the data type in the header portion in the Y-axis is set. In the combination information on the data types, a combination of the fixed character strings in the header portion in the Z-axis and the identifiers of the enumeration type as the character string types is set. Here, as the combination of the data types in the header portion in the X-axis, a set of ""Assets Evaluation", "Liabilities Rank"" is set. As the combination of the data types in the header portion in the Y-axis, a set of ""PERIOD", character string type" is set. As the combination of the data types in the header portion in the Z-axis, a set of ""SEGMENT", enumeration type x, "AREA", enumeration type y" is set. When the data conversion unit 33 performs the data conversion process on the read line, the data conversion unit 33 may acquire, from the XBRL taxonomy 21, an enumeration value associated with the identifier of the enumeration type and determine whether the read line has the same combination of the character strings including one of the character strings of the enumeration value in the title line of the table.

Third Specific Example of the Data Conversion Process

In the following, a third specific example of the data conversion process performed by using the mapping definition 22 illustrated in FIG. 8 will be described with reference to FIG. 7.

For example, because the case in which the data conversion unit 33 refers to the input completion sheet 24 and reads the line indicated by the code b1 is the same as that described in the second specific example, descriptions thereof will be omitted.

Then, it is assumed that the data conversion unit 33 refers to the input completion sheet 24 and reads the line indicated by the code b2. The data conversion unit 33 specifies, regarding the read line, the combination of the characters or the character strings and the combination of the data types. Here, regarding the combination of the characters or the character strings indicated by the code b2, a set of ""SEGMENT", "Device", "AREA", "Europe"" is specified. Regarding the combination of the data types in the line indicated by the code b2, a set of "character string type, character string type, character string type, character string type" is specified.

The data conversion unit 33 determines whether the combination of the data types in the line indicated by the code b2 has the same combination as that in the data input line. Here, the combinations of the data types in all of the lines have a set of "character string type, character string type, character string type, character string type".

Thus, the data conversion unit 33 determines whether the line indicated by the code b2 has the same combination as the combination of the character strings in the title line of the table. Here, the combination of the character strings indicated by the code b2 is a set of ""SEGMENT", "Device", "AREA", "Europe"". The combination of the character strings in the title line of the table is a set of ""SEGMENT", enumeration type x, "AREA", enumeration type y". Thus, the data conversion unit 33 inquires of the XBRL taxonomy 21 about the enumeration values of the enumeration type x and the enumeration type y. Then, the combination of the character strings in the title line of the table is a set of ""SEGMENT", "Device" or "Ubiquitous" or "Technology", "AREA", "Asia" or "Oceania" or "Europe" or "America"". The first character string out of each of the combinations is "SEGMENT" and is thus the same. Regarding the second character string out of each of the combinations, the character string of "Device" in the line indicated by the code b2 is included in the combination of the character strings in the title line of the table and is thus the same. The third character string out of each of the combinations is "AREA" and is thus the same. Regarding the fourth character string out of each of the combinations, the character string of "Europe" in the line indicated by the code b2 is included in the combination of the character strings in the title line of the table and is thus the same. Accordingly, the line indicated by the code b2 has the same combination as that of the character strings in the title line of the table. Namely, the line indicated by the code b2 is the title line of the table.

Thus, the data conversion unit 33 detects that the line indicated by the code b2 is the start position of the next table. Then, the data conversion unit 33 performs the data conversion process on the next table in the input completion sheet 24.

Outline of the Structural Analysis Process

Figure 9:
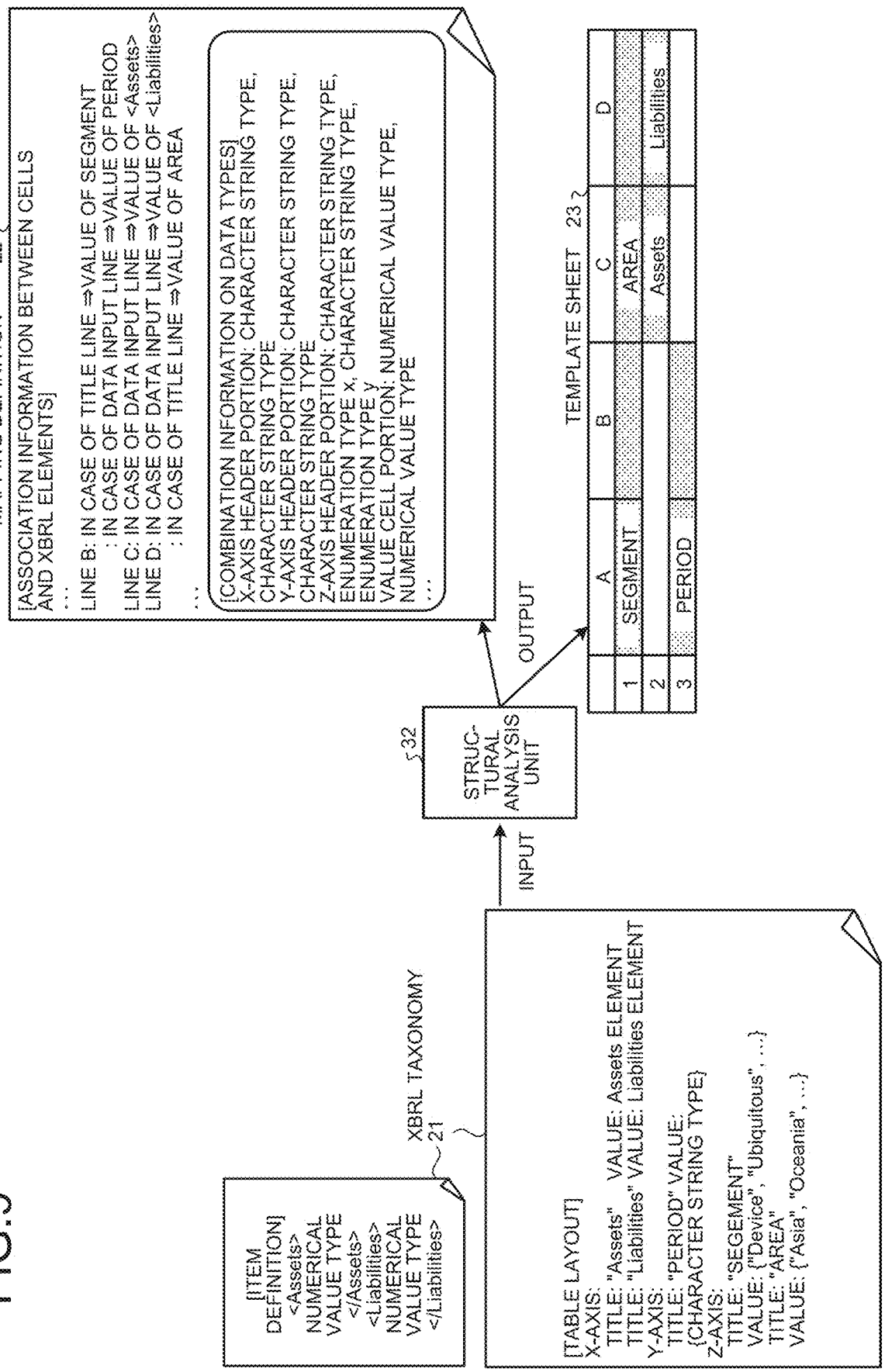
FIG. 9 is a diagram illustrating the outline of a structural analysis process according to the embodiment.

In the following, the outline of the structural analysis process according to the embodiment will be described with reference to FIG. 9. FIG. 9 is a diagram illustrating the outline of a structural analysis process according to the embodiment. As illustrated in FIG. 9, the structural analysis unit 32 inputs the XBRL taxonomy 21. Then, the structural analysis unit 32 analyzes the input XBRL taxonomy 21 and generates and outputs the mapping definition 22 and the template sheet 23.

For example, the structural analysis unit 32 acquires, from the table layout of the XBRL taxonomy 21, the layout (arrangement order) of the header portions in the X-, Y- and, Z-axes and the value cell portions. The structural analysis unit 32 acquires, from the table layout of the XBRL taxonomy 21, information on the header portions in the X-, Y- and, Z-axes and the data types in the value cell portion. An example of the information on the header portions in the X-, Y- and, Z-axes includes the character string of the title and the data type of the value of the character string. Here, in the X-axis, as the title, "Assets" and "Liabilities" are listed in this order. In the Y-axis, as the title, "PERIOD" and the value of "PERIOD" are listed in this order. Then, the data type of the value of "PERIOD" indicates the character string type. In the Z-axis, as the title, "SEGMENT", the value of "SEGMENT", "AREA", and the value of "AREA" are listed in this order. Furthermore, the data type of the value of "SEGMENT" indicates the enumeration type. The data type of the value of "AREA" indicates the enumeration type. The value cell portion is associated with the cell, in which the value of "Assets" in the X-axis is input, and the cell, in which the value of "Liabilities" is input. The data type in the cell, in which the value of "Assets" is input, is the data type of element indicated by Assets and indicates the numerical value type. The data type in the cell, in which the value of "Liabilities" is input, is the data type of the element indicated by Liabilities and indicates the numerical value type. The data types of the XBRL elements are acquired from the item definition.

Then, the structural analysis unit 32 generates the template sheet 23 in accordance with the analyzed layout and outputs the generated template sheet 23.

Then, the structural analysis unit 32 sets the information on the XBRL element associated with each of the cells in the template sheet 23 in the association information on the cells and the XBRL elements in the mapping definition 22. The structural analysis unit 32 sets, in accordance with the analyzed layout, the combination of the data types of the title in the header portion and the combination of the data types in the value cell portion in the combination information on the data types in the mapping definition 22. Here, in the header portion in the X-axis, the combination information on the character string type and the character string type is set. In the header portion in the Y-axis, the combination information on the character string type and the character string type is set. In the header portion in the Z-axis, the combination information on the character string type, the enumeration type x, the character string type, and the enumeration type y is set. In the value cell portion, combination information on the numerical value type and the numerical value type is set.

Furthermore, in FIG. 9, the structural analysis unit 32 has generated the combination information on the data types in the mapping definition 22 as the combination of data types and the character strings including the character strings of the enumeration types; however, the combination is not limited to this. The structural analysis unit 32 may also generate, similarly to the second mapping definition 22, a combination by using a combination of a fixed character string and a data type or may also generate, similarly to the third mapping definition 22, a combination by using a combination of character strings including character strings of the enumeration types.

[Outline of the Data Conversion Process]

In the following, the outline of the data conversion process according to the embodiment will be described with reference to FIG. 10. FIG. 10 is a diagram illustrating the outline of the data conversion process according to the embodiment. As illustrated in FIG. 10, the data conversion unit 33 inputs the input completion sheet 24 and the mapping definition 22. Then, the data conversion unit 33 refers to the mapping definition 22 and the XBRL taxonomy 21, maps (converts) the financial data that has been input to the input completion sheet 24, and outputs (adds) the financial data to the XBRL instance 41.

Here, in the XBRL instance 41 converted from the input completion sheet 24, if SEGMENT is "Device" and AREA is "Asia", the value of Assets indicated as PERIOD "2014.03.31" is set to "1000". Furthermore, if SEGMENT is "Device" and AREA is "Europe", the value of Liabilities indicated as PERIOD "2014.12.31" is set to "8100".

Example of the Flowchart of the Structural Analysis Process

Figure 11:
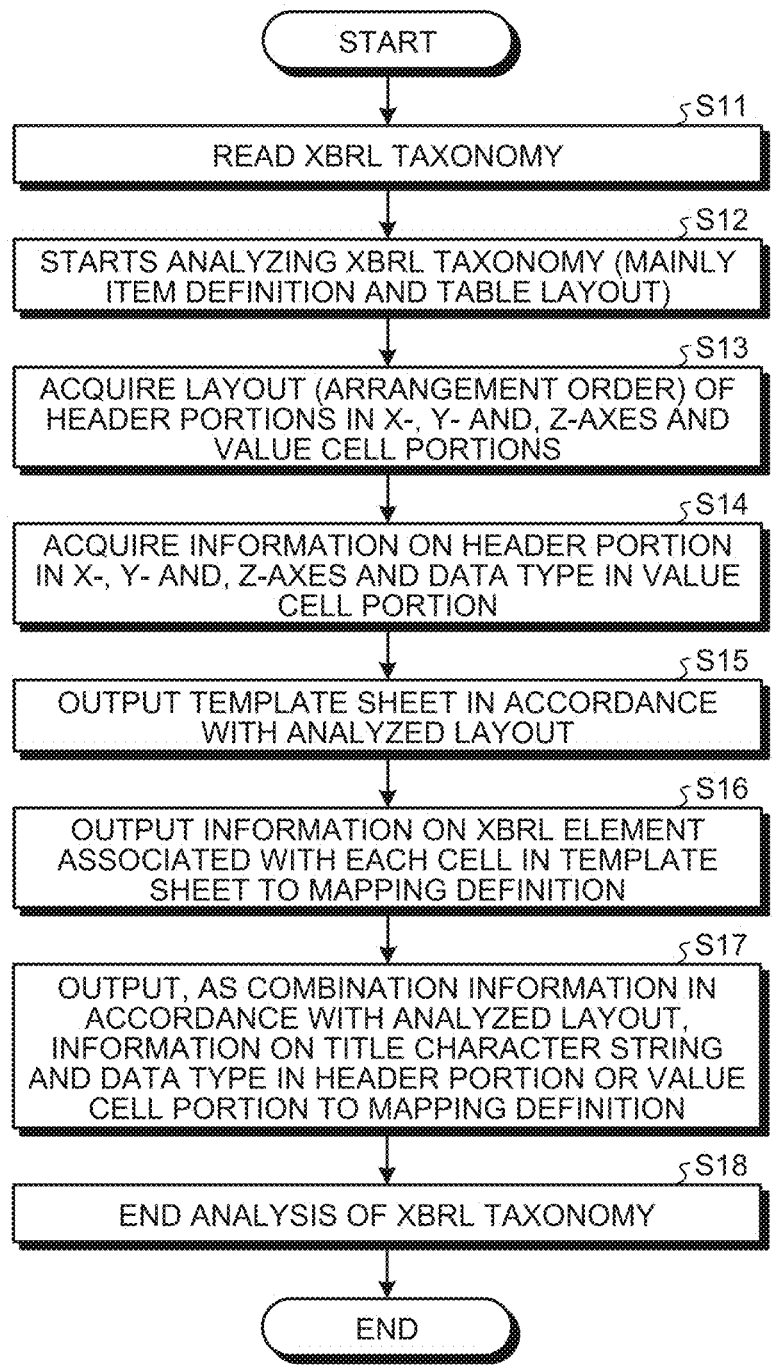
FIG. 11 is a flowchart illustrating an example of the structural analysis process according to the embodiment.

In the following, a flowchart of the structural analysis process according to the embodiment will be described with reference to FIG. 11. FIG. 11 is a flowchart illustrating an example of the structural analysis process according to the embodiment.

First, the structural analysis unit 32 reads the XBRL taxonomy 21 (Step S11). The structural analysis unit 32 starts analyzing the XBRL taxonomy 21 (Step S12). The analyzation of the XBRL taxonomy 21 mentioned here is mainly analyzing the item definition and the table layout.

The structural analysis unit 32 refers to the table layout and acquires the layout (arrangement order) of the header portions in the X-, Y- and, Z-axes and the value cell portion (Step S13). The structural analysis unit 32 refers to the table layout and the item definition and acquires information on the header portion in the X-, Y- and, Z-axes and the data type in the value cell portion (Step S14). In the information in the header portion in the X-, Y- and, Z-axes, the character strings of the title and the data types of the values of the character string are included.

The structural analysis unit 32 generates the template sheet 23 in accordance with the analyzed layout (arrangement order) and outputs the template sheet 23 (Step S15).

The structural analysis unit 32 outputs the information on the XBRL element associated with each of the cells in the generated template sheet 23 to the cells in the mapping definition 22 and the association information in the XBRL element (Step S16). The structural analysis unit 32 outputs, as combination information in accordance with the analyzed layout (arrangement order), the information on the character strings and the data types included in the title in the header portion and the value cell portion to the combination information on the data types in the mapping definition 22 (Step S17). Then, the structural analysis unit 32 ends analysis of the XBRL taxonomy 21 (Step S18).

Example of the Flowchart of the Data Conversion Process

Figure 12:
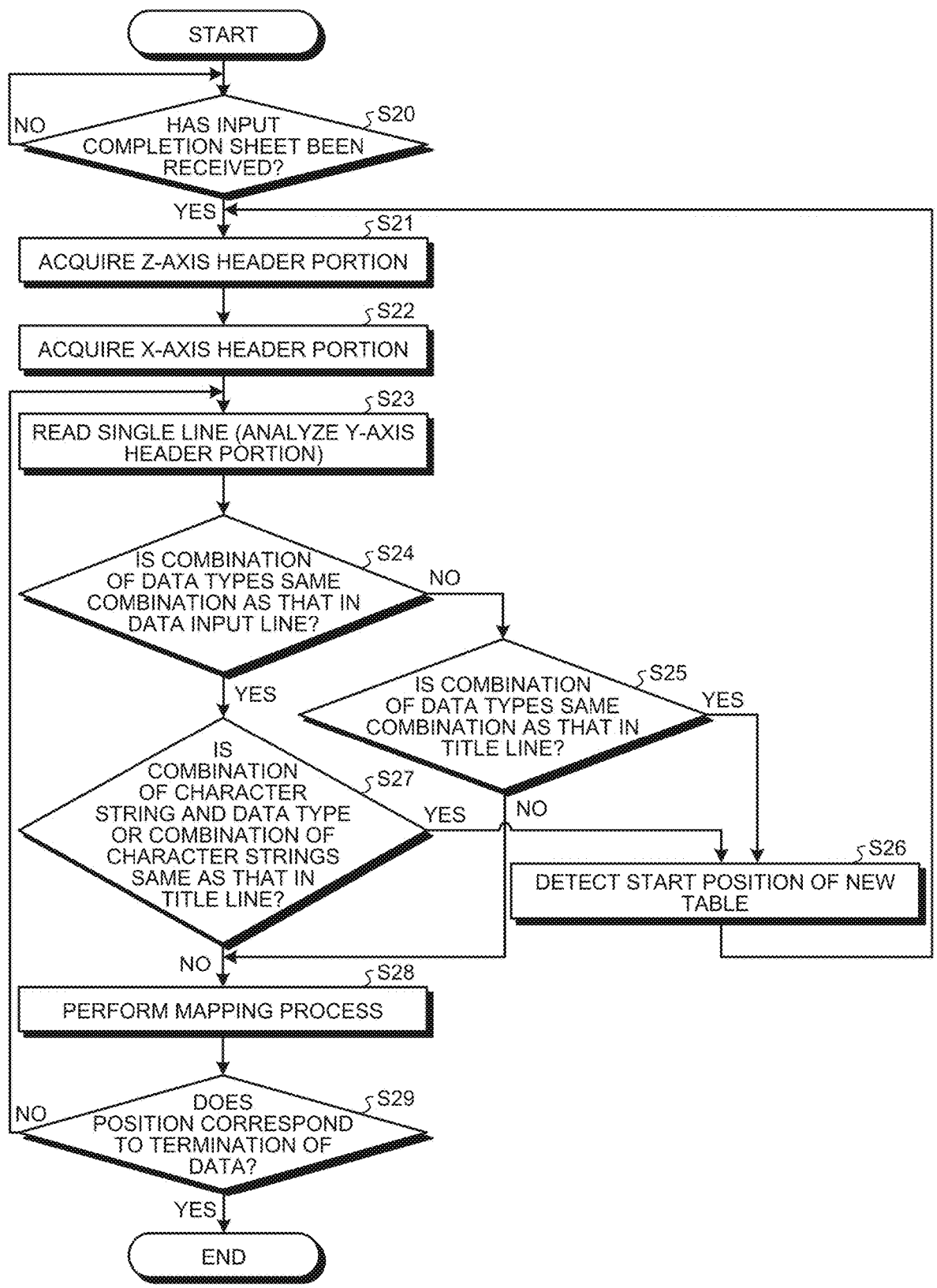
FIG. 12 is a flowchart illustrating an example of the data conversion process according to the embodiment.

In the following, the flowchart of the data conversion process according to the embodiment will be described with reference to FIG. 12. FIG. 12 is a flowchart illustrating an example of the data conversion process according to the embodiment.

First, the data conversion unit 33 determines whether the data conversion unit 33 has received the input completion sheet 24 (Step S20). If the data conversion unit 33 determines that the data conversion unit 33 has not received the input completion sheet 24 (No at Step S20), the data conversion unit 33 repeats the determination process until the data conversion unit 33 receives the input completion sheet 24.

In contrast, if it is determined that the input completion sheet 24 has been received (Yes at Step S20), the data conversion unit 33 acquires the header portion in the Z-axis from the received input completion sheet 24 (Step S21). Namely, the data conversion unit 33 sequentially reads, for each line, the line from the header portion in the Z-axis that is present in the first line of the table in the received input completion sheet 24. Then, the data conversion unit 33 acquires the header portion in the X-axis from the input completion sheet 24 (Step S22).

Subsequently, the data conversion unit 33 reads the next single line as the analysis target line (Step S23). Namely, the data conversion unit 33 analyzes the line subsequent to the header portion in the Y-axis in the first table and detects the start position of the next table. The data conversion unit 33 determines whether the combination of the data types in the analysis target line has the same combination as that in the data input line registered in the mapping definition 22 (Step S24). The combination of the data types in the data input line is obtained by adding the combination of the data types in the header portion in the Y-axis to the combination of the data types in the value cell portion.

If the data conversion unit 33 determines that the combination of the data types in the analysis target line is the same as that in the data input line (Yes at Step S24), the data conversion unit 33 proceeds to Step S27.

If the data conversion unit 33 determines that the combination of the data types in the analysis target line is not the same as that in the data input line (No at Step S24), the data conversion unit 33 performs the following process. Namely, the data conversion unit 33 determines whether the combination of the data types in the analysis target line is the same as that in the title line of the table stored in the mapping definition 22 (Step S25). The combination of the data types in the title line of the table is the combination of the data types in the header portion in the Z-axis.

If the data conversion unit 33 determines that the combination of the data types in the analysis target line is the same as that in the title line of the table (Yes at Step S25), the data conversion unit 33 detects the analysis target line as the start position of the next table (Step S26). Then, the data conversion unit 33 proceeds to Step S21 in order to perform the mapping process on the next table.

In contrast, if the data conversion unit 33 determines that the combination of the data types in the analysis target line is not the same as that in the title line of the table (No at Step S25), the data conversion unit 33 proceeds to Step S28 in order to perform the mapping process on the analysis target line. Furthermore, in such a case, the analysis target line does not match the data input line and the title line of the table; therefore, this is a case of an input error caused by a user. Thus, the data conversion unit 33 may also send, as a notification at the time of mapping process, an error in accordance with the input data type.

At Step S24, if the data conversion unit 33 determines that the combination of the data types in the analysis target line is the same as that in the data input line (Yes at Step S24), the data conversion unit 33 performs the following process. Namely, the data conversion unit 33 determines whether the combination of the character string and the data type in the analysis target line is the same as that in the title line of the table registered in the mapping definition 22. This case is a case of using the second mapping definition 22. Alternatively, the data conversion unit 33 determines whether the combination of the character strings in the analysis target line is the same as that in the title line of the table registered in the mapping definition 22 (Step S27). This case is a case of using the third mapping definition 22.

If the data conversion unit 33 determines that the combination of the character string and the data type in the analysis target line or the combination of the character strings in the analysis target line is the same as that in the title line of the table (Yes at Step S27), the data conversion unit 33 proceeds to Step S26. Namely, the data conversion unit 33 detects the analysis target line as the start position of the next table.

In contrast, if the data conversion unit 33 determines that the combination of the character string and the data type in the analysis target line or the combination of the character strings in the analysis target line is not the same as that in the title line of the table (No at Step S27), the data conversion unit 33 determines that the analysis target line is the same as the header portion in the Y-axis. Then, the data conversion unit 33 performs the mapping process on the analysis target line (Step S28).

The data conversion unit 33 determines whether the position is the termination of the data (Step S29). If the data conversion unit 33 determines that the position is not the termination of the data (No at Step S29), the data conversion unit 33 proceeds to Step S23 in order to read the next single line. In contrast, if the data conversion unit 33 determines that the position is the termination of the data (Yes at Step S29), the data conversion unit 33 ends the data conversion process.

Example of a Use of the Evaluation Device

Figure 13:
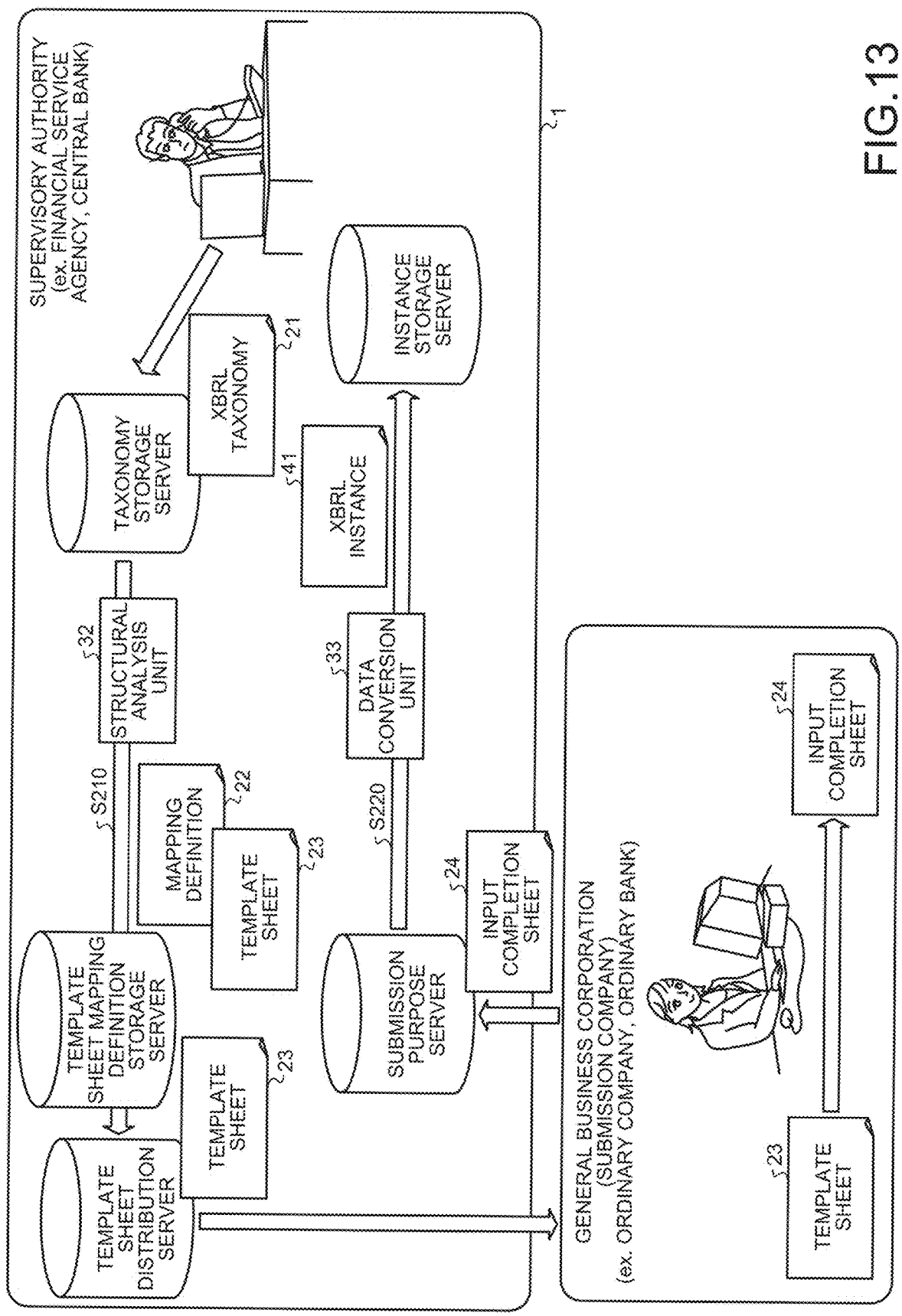
FIG. 13 is a diagram illustrating an example of a use of the evaluation device according to the embodiment.

In the following, an example of a use of the evaluation device according to the embodiment will be described with reference to FIG. 13. FIG. 13 is a diagram illustrating an example of a use of the evaluation device according to the embodiment. As illustrated in FIG. 13, the evaluation device 1 is installed on the supervisory authority side. The XBRL taxonomy 21 is generated by the supervisory authority. Then, the structural analysis unit 32 inputs the generated XBRL taxonomy 21 and generates, by using the input XBRL taxonomy 21, the template sheet 23 and the mapping definition 22 (S210). The supervisory authority opens the generated template sheet 23 and the mapping definition 22 to the public such that the submission company can acquire the template sheet 23. The submission company inputs the financial data by using the acquired template sheet 23 and generates the input completion sheet 24. Then, the data conversion unit 33 inputs the input completion sheet 24 and converts the input completion sheet 24, which has been input, to the XBRL instance 41 (S220).

Furthermore, the evaluation device 1 illustrated in FIG. 13 is a server model installed on the supervisory authority side; however, the configuration is not limited to this. The evaluation device 1 may also be a client model that is installed on the submission company side.

Effect of the Embodiment

According to the embodiment described above, the evaluation device 1 refers to the input completion sheet 24 that stores therein table information having a plurality of lines and specifies, regarding each of the lines out of the plurality of lines, a combination of data classifications of characters or character strings associated with a plurality of cells that are included in each of the lines. The evaluation device 1 refers to the mapping definition 22 that stores therein information on combinations of data classifications associated with a plurality of cells included in specific lines out of the plurality of lines and then acquires a combination of data classifications stored in the mapping definition 22. The evaluation device 1 compares, regarding each of the lines out of the plurality of lines, the acquired combination of the data classifications with the specified combination of the data classifications and evaluates, in accordance with the comparison result, the line targeted for the comparison process. With this configuration, the evaluation device 1 can specify the same line as a specific line out of the plurality of lines that are included in the table information in the input completion sheet 24.

Furthermore, according to the embodiment described above, if the combination of the data classifications acquired from the mapping definition 22 is the same as the combination of the data classifications specified from the input completion sheet 24, the evaluation device 1 performs the following process. The evaluation device 1 refers to the input completion sheet 24 and further specifies, regarding each of the lines out of the plurality of lines, a combination of characters or character strings and data classifications that are associated with the plurality of cells included in each of the lines. The evaluation device 1 refers to the mapping definition 22 that stores therein the combinations of the characters or the character strings and the data classifications that are associated with the plurality of cells included in the specific lines and then acquires a combination of the characters, the character strings, and the data classifications stored in the mapping definition 22. The evaluation device 1 compares, regarding each of the lines out of the plurality of lines, the acquired combination of the characters, the character strings, and the data classification with the specified combination of the characters, the character strings, and the data classifications. With this configuration, the evaluation device 1 can more reliably specify the same line as the specific line.

Furthermore, according to the embodiment described above, the evaluation device 1 refers to the XBRL taxonomy 21 and generates information on the combinations of data classifications associated with the plurality of cells that are included in the specific lines. The evaluation device 1 stores the information on the combinations of the generated data classifications in the mapping definition 22. With this configuration, by using the mapping definition 22 that stores therein information on the combinations of the data classifications, the evaluation device 1 can specify a specific line in each of the tables even if a plurality of tables is present in the input completion sheet 24.

Furthermore, according to the embodiment described above, the evaluation device 1 refers to the XBRL taxonomy 21 and generates information on combinations of characters or character strings and the data classifications associated with the plurality of cells included in the specific lines. The evaluation device 1 stores, in the mapping definition 22, the generated information on the combinations of the characters or the character strings and the data classifications. With this configuration, by using the mapping definition 22 that stores therein information on the combinations of the characters or the character strings and the data classification, the evaluation device 1 can further specify a specific line in each of the tables even if a plurality of tables is present in the input completion sheet 24.

Programs, Etc.

Furthermore, the evaluation device 1 can be implemented by mounting each of the functions of the control unit 3, the storage unit 2, and the like described above on an information processing apparatus, such as a known personal computer or a workstation.

Furthermore, each of the components in the evaluation device 1 illustrated in the drawings is not always physically configured as illustrated in the drawings. In other words, the specific shape of the separate or integrated the evaluation device 1 is not limited to the drawings; however, all or part of the device can be configured by functionally or physically separating or integrating any of the units depending on various loads or use conditions. For example, the input unit 31 and the structural analysis unit 32 may also be integrated as a single unit. The data conversion unit 33 and the output unit 34 may also be integrated as a single unit. In contrast, the structural analysis unit 32 may also be separated into a first creating unit that generates the mapping definition 22 and a second creating unit that generates the template sheet 23. Furthermore, the storage unit 2, such as the XBRL taxonomy 21, the mapping definition 22, the template sheet 23, and the input completion sheet 24, may also be connected as an external device of the evaluation device 1 via a network.

Figure 14:
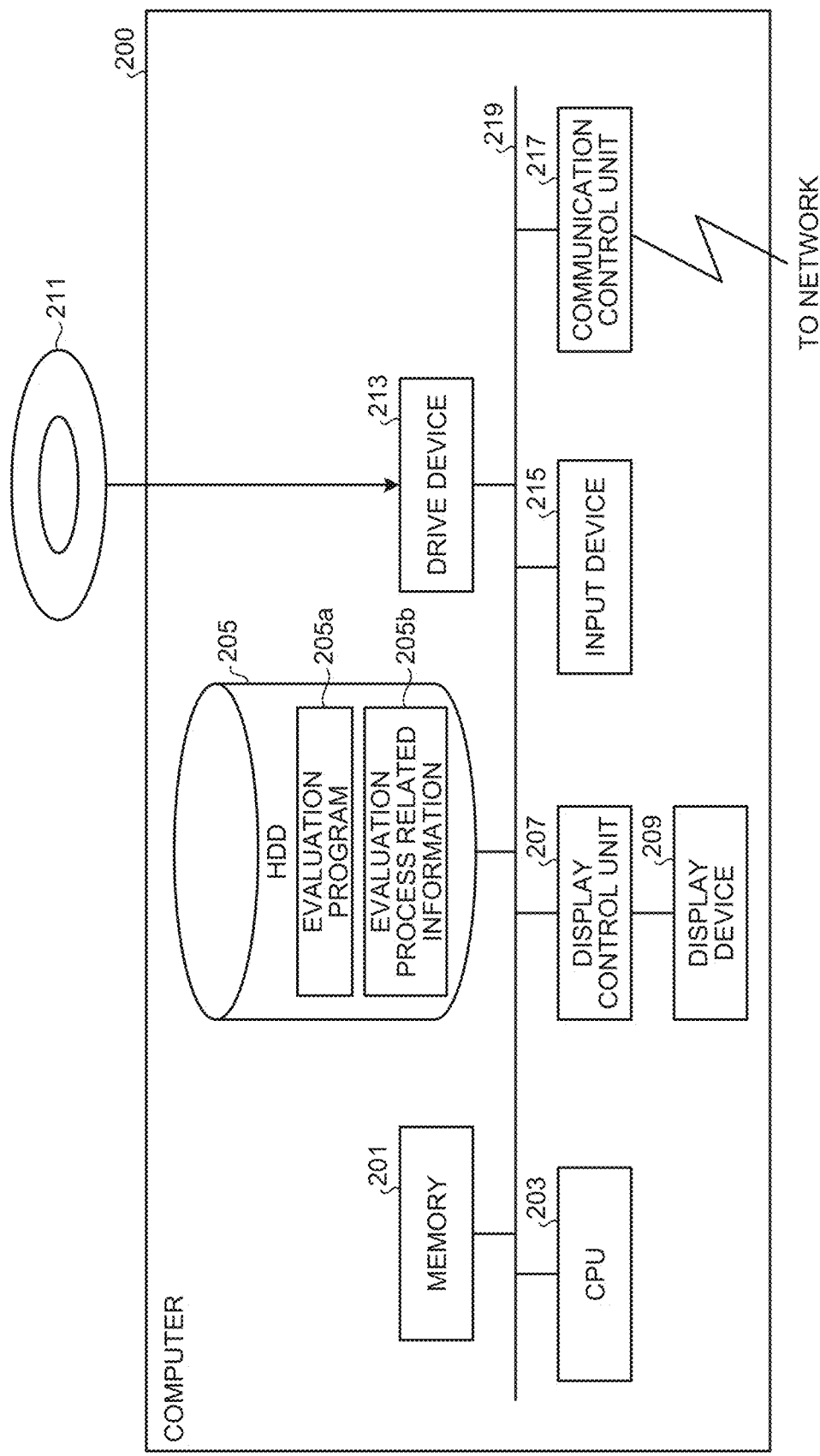
FIG. 14 is a diagram illustrating an example of a computer that executes an evaluation program.
Figure 15:
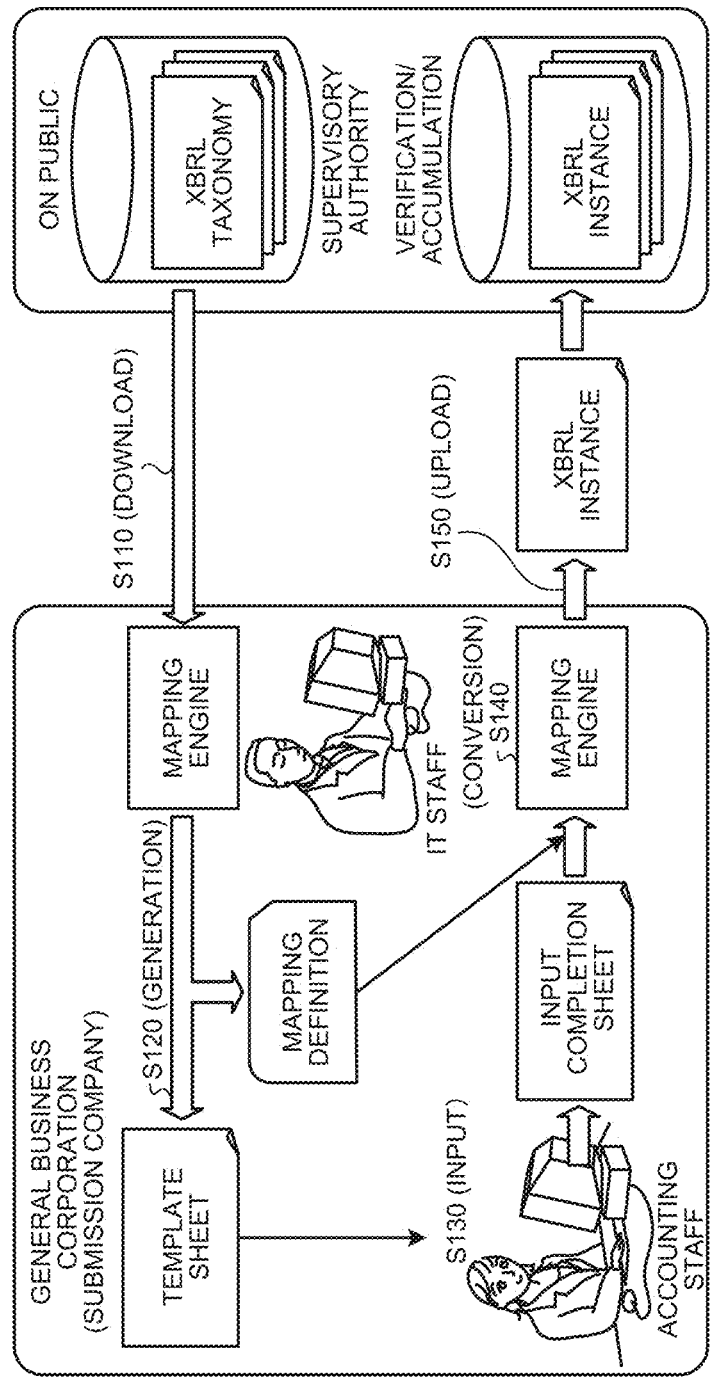
FIG. 15 is a diagram illustrating a reference example of the flow of generating instances.
Figure 17:
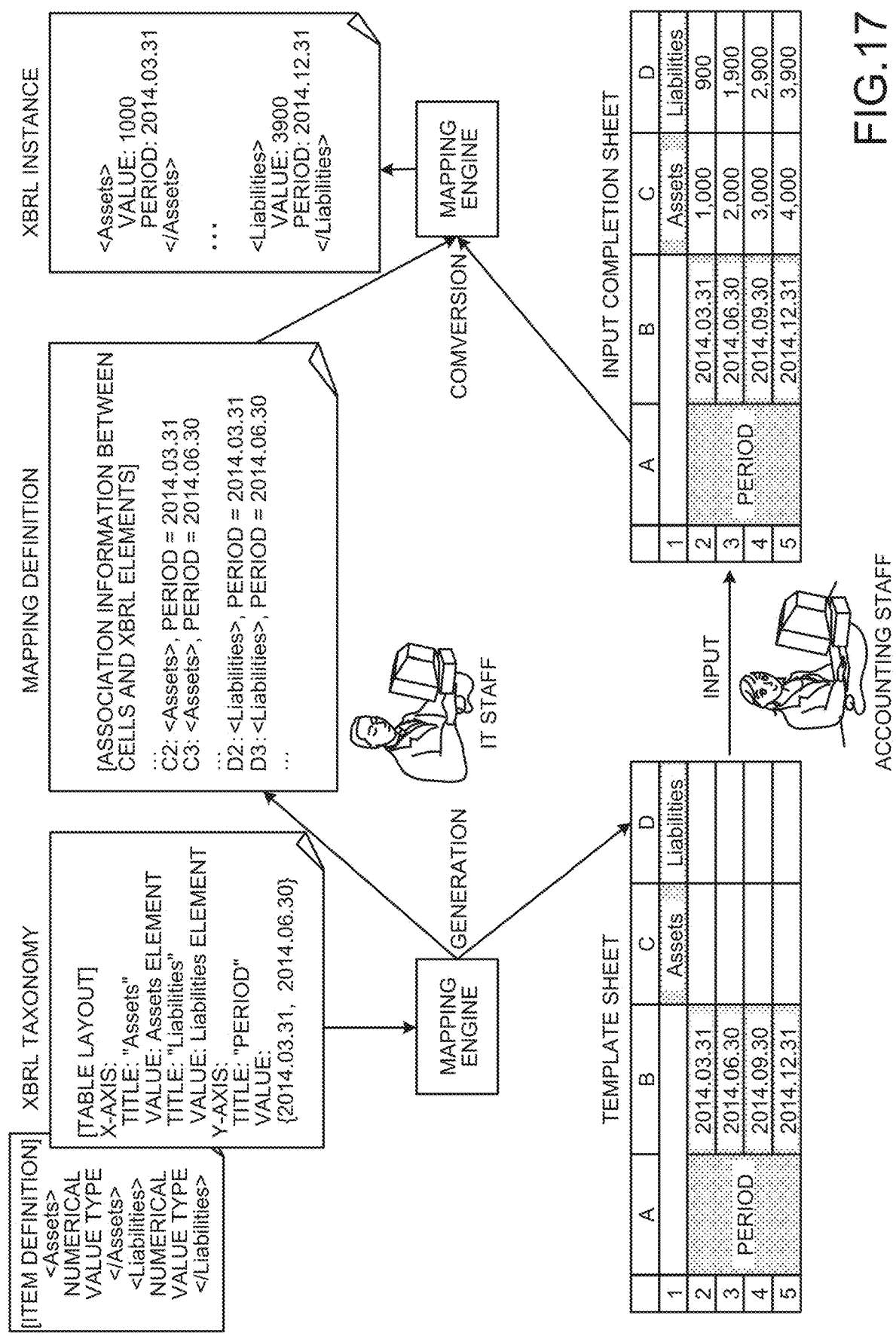
FIG. 17 is a diagram illustrating a reference example of a mapping process.

Furthermore, various kinds of processes described in the above embodiments can be implemented by executing programs prepared in advance in a computer system, such as a personal computer, a workstation, or the like. Thus, in the following, an example of a computer that executes an evaluation program that implements the same function as that performed by the evaluation device 1 illustrated in FIG. 1 will be described. FIG. 14 is a diagram illustrating an example of a computer that executes an evaluation program.

As illustrated in FIG. 14, a computer 200 includes a CPU 203 that executes various kinds arithmetic processing, an input device 215 that receives an input of data from a user, and a display control unit 207 that controls a display device 209. Furthermore, the computer 200 includes a drive device 213 that reads programs or the like from a storage medium and a communication control unit 217 that sends and receives data to and from another computer via the network. Furthermore, the computer 200 includes a memory 201 that temporarily stores therein various kinds of information and an HDD 205. Then, the memory 201, the CPU 203, the HDD 205, the display control unit 207, the drive device 213, the input device 215, and the communication control unit 217 are connected by a bus 219.

The drive device 213 is a device for, for example, a removable disk 211. The HDD 205 stores therein an evaluation program 205a and evaluation process related information 205b.

The CPU 203 reads the evaluation program 205a and loads the evaluation program 205a in the memory 201. The evaluation program 205a functions as an evaluation process.

For example, the evaluation process corresponds to each of the functioning units in the control unit 3. The evaluation process related information 205b corresponds to the XBRL taxonomy 21, the mapping definition 22, the template sheet 23, and the input completion sheet 24.

Furthermore, the evaluation program 205a does not need to be stored in the HDD 205 from the beginning. For example, the program is stored in a "portable physical medium", such as a flexible disk (FD), a CD-ROM, a DVD disk, a magneto-optic disk, an IC CARD, or the like, that is to be inserted into the computer 200. Then, the computer 200 may also read and execute the evaluation program 205a from the portable physical medium.

According to an aspect of an embodiment, when a plurality of tables is converted to instances, it is possible to distinguish the start position of each of the tables.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing therein an evaluation program that causes a computer to execute a process comprising:

specifying, by referring to a first storage that stores therein table information of a table having a plurality of lines each of which includes a plurality of cells that are associated with characters or character strings, regarding each of the lines out of the plurality of lines, a combination of data classifications of the characters or the character strings associated with the plurality of cells that are included in each of the lines;

acquiring, by referring to a second storage that stores therein information on combinations of data classifications associated with a plurality of cells that are included in specific lines including a start line of the table, a combination of the data classifications stored in the second storage, the combination of the data classifications being associated with the plurality of cells that are included in the start line of the table;

comparing, regarding each of the lines out of the plurality of lines, the acquired combination of the data classifications in the start line of the table with the specified combination of the data classifications; and evaluating, when the acquired combination of the data classifications in the start line of the table and the specified combination of the data classifications are the same, the line targeted for a comparison process, as the start line of the table, wherein the comparing includes further specifying, by referring to, when the acquired combination of the data classifications and the specified combination of the data classifications are the same, the first storage that stores therein the table information, regarding each of the lines out of the plurality of lines, a combination of characters or character strings and data classifications that are associated with the plurality of cells included in each of the lines, acquiring, by referring to a third storage that stores therein combinations of the characters or the character strings and the data classifications that are associated with the plurality of cells included in the specific lines, a combination of the characters, the character strings, and the data classifications stored in the third storage, and comparing, regarding each of the lines out of the plurality of lines, the acquired combination of the characters, the character strings, and the data classifications with the specified combination of the characters, the character strings, and the data classifications, wherein the process includes:

generating, by referring to definition information that defines a layout of a table, information on combinations of the characters or the character strings and the data classifications that are associated with the plurality of cells included in the specific lines; and storing the generated information on the combinations of the characters or the character strings and the data classifications in the third storage, wherein the specifying includes specifying a specific line in each of tables by using mapping definition that stores therein information on the combinations of the characters or the character strings and the data classifications.

2. The non-transitory computer-readable recording medium according to claim 1, further including:

generating, by referring to definition information that defines a layout of a table, information on combinations of the data classifications associated with the plurality of cells that are included in the specific lines; and storing the generated information on the combinations of the data classifications in the second storage.

3. An evaluation device comprising:

a processor configured to:

specify, by referring to a first storage that stores therein table information of a table having a plurality of lines each of which includes a plurality of cells that are associated with characters or character strings, regarding each of the lines out of the plurality of lines, a combination of data classifications of the characters or the character strings associated with the plurality of cells that are included in each of the lines;

acquire, by referring to a second storage that stores therein information on combinations of data classifications associated with a plurality of cells that are included in specific lines including a start line of the table, a combination of the data classifications stored in the second storage, the combination of the data classifications being associated with the plurality of cells that are included in the start line of the table;

compare, regarding each of the lines out of the plurality of lines, the acquired combination of the data classifications in the start line of the table with the specified combination of the data classifications; and evaluate, when the acquired combination of the data classifications in the start line of the table and the specified combination of the data classifications are the same, the line targeted for a comparison process, as the start line of the table, wherein the comparing includes further specifying, by referring to, when the acquired combination of the data classifications and the specified combination of the data classifications are the same, the first storage that stores therein the table information, regarding each of the lines out of the plurality of lines, a combination of characters or character strings and data classifications that are associated with the plurality of cells included in each of the lines, acquiring, by referring to a third storage that stores therein combinations of the characters or the character strings and the data classifications that are associated with the plurality of cells included in the specific lines, a combination of the characters, the character strings, and the data classifications stored in the third storage, and comparing, regarding each of the lines out of the plurality of lines, the acquired combination of the characters, the character strings, and the data classifications with the specified combination of the characters, the character strings, and the data classifications, wherein the process includes:

generating, by referring to definition information that defines a layout of a table, information on combinations of the characters or the character strings and the data classifications that are associated with the plurality of cells included in the specific lines; and storing the generated information on the combinations of the characters or the character strings and the data classifications in the third storage, wherein the specifying includes specifying a specific line in each of tables by using mapping definition that stores therein information on the combinations of the characters or the character strings and the data classifications.

4. An evaluation method comprising:

specifying, by referring to a first storage that stores therein table information of a table having a plurality of lines each of which includes a plurality of cells that are associated with characters or character strings, regarding each of the lines out of the plurality of lines, a combination of data classifications of the characters or the character strings associated with the plurality of cells that are included in each of the lines, by a processor;

acquiring, by referring to a second storage that stores therein information on combinations of data classifications associated with a plurality of cells that are included in specific lines including a start line of the table, a combination of the data classifications stored in the second storage, the combination of the data classifications being associated with the plurality of cells that are included in the start line of the table;

comparing, regarding each of the lines out of the plurality of lines, the acquired combination of the data classifications in the start line of the table with the specified combination of the data classifications; and evaluating, when the acquired combination of the data classifications in the start line of the table and the specified combination of the data classifications are the same, the line targeted for a comparison process, as the start line of the table, wherein the comparing includes further specifying, by referring to, when the acquired combination of the data classifications and the specified combination of the data classifications are the same, the first storage that stores therein the table information, regarding each of the lines out of the plurality of lines, a combination of characters or character strings and data classifications that are associated with the plurality of cells included in each of the lines, acquiring, by referring to a third storage that stores therein combinations of the characters or the character strings and the data classifications that are associated with the plurality of cells included in the specific lines, a combination of the characters, the character strings, and the data classifications stored in the third storage, and comparing, regarding each of the lines out of the plurality of lines, the acquired combination of the characters, the character strings, and the data classifications with the specified combination of the characters, the character strings, and the data classifications, wherein the process includes:

generating, by referring to definition information that defines a layout of a table, information on combinations of the characters or the character strings and the data classifications that are associated with the plurality of cells included in the specific lines; and storing the generated information on the combinations of the characters or the character strings and the data classifications in the third storage, wherein the specifying includes specifying a specific line in each of tables by using mapping definition that stores therein information on the combinations of the characters or the character strings and the data classifications.

* * * * *